US010620329B2

(12) United States Patent
Herrmann

(10) Patent No.: US 10,620,329 B2
(45) Date of Patent: Apr. 14, 2020

(54) WATER-COUPLED UNDERWATER NODE FOR SEISMIC SURVEYS

(71) Applicant: Seabed Geosolutions B.V., Leidschendam (NL)

(72) Inventor: Philippe Herrmann, Villepreux (FR)

(73) Assignee: Seabed Geosolutions B.V., Leidschendam (NL)

( * ) Notice: Subject to any disclaimer, the term of this patent is extended or adjusted under 35 U.S.C. 154(b) by 2025 days.

(21) Appl. No.: 13/664,733

(22) Filed: Oct. 31, 2012

(65) Prior Publication Data

US 2013/0163374 A1 Jun. 27, 2013

(30) Foreign Application Priority Data

Dec. 21, 2011 (FR) ...................... 11 62168

(51) Int. Cl.
*G01V 1/16* (2006.01)
*G01V 1/18* (2006.01)
*G01V 1/38* (2006.01)

(52) U.S. Cl.
CPC ............ *G01V 1/189* (2013.01); *G01V 1/3852* (2013.01)

(58) Field of Classification Search
CPC .. B63C 7/12; B63C 7/04; B63C 11/00; B63G 8/001; B63G 8/00; B63G 8/08
USPC .......................................................... 367/15
See application file for complete search history.

(56) References Cited

U.S. PATENT DOCUMENTS

| 3,221,296 | A | * | 11/1965 | Milne | ............................. | 367/46 |
| 3,665,883 | A | * | 5/1972 | Sege | .............................. | 114/331 |
| 4,901,287 | A | * | 2/1990 | Hathaway | .............. | G01V 1/201 |
| | | | | | | 114/326 |
| 5,339,281 | A | | 8/1994 | Narendra et al. | | |
| 5,866,827 | A | | 2/1999 | Stewart et al. | | |
| 6,625,083 | B2 | | 9/2003 | Vandenbroucke | | |
| 6,932,185 | B2 | | 8/2005 | Bary et al. | | |
| 7,359,283 | B2 | * | 4/2008 | Vaage | .................. | G01V 1/3808 |
| | | | | | | 367/15 |

(Continued)

FOREIGN PATENT DOCUMENTS

EP          1217390 A1    6/2002
WO     2004/031807 A1    4/2004

OTHER PUBLICATIONS

Chi-Wei Ho and Pei-Chun Lin, Design and Implementation of a 12-Axis Accelerometer Suite, The 2009 IEEE/RSJ International Conference on Intelligent Robots and Systems Oct. 11-15, 2009 St. Louis, USA.*

(Continued)

*Primary Examiner* — Hovhannes Baghdasaryan
*Assistant Examiner* — Jonathan D Armstrong
(74) *Attorney, Agent, or Firm* — Park, Vaughan, Fleming & Dowler LLP; Shane Nelson

(57) ABSTRACT

A marine node for recording seismic waves underwater. The node includes a spherical body made of a material that has a density similar to a density of the water so that the body is buoyant neutral; a first sensor located in the body and configured to record three dimensional movements of the node; a second sensor located in the body and configured to record pressure waves propagating through the water; and one or more cables connected to the first and second sensors and configured to exit the body to be connected to an external device. The body is coupled to the water.

9 Claims, 11 Drawing Sheets

(56) References Cited

U.S. PATENT DOCUMENTS

| | | | | |
|---|---|---|---|---|
| 7,690,936 | B1* | 4/2010 | Snekkevik | H01R 13/523 |
| | | | | 439/201 |
| 8,054,712 | B1* | 11/2011 | Kasper | G01C 13/00 |
| | | | | 367/128 |
| 8,085,622 | B2* | 12/2011 | Donskoy | G01P 5/02 |
| | | | | 367/140 |
| 2006/0044938 | A1 | 3/2006 | Shipps et al. | |
| 2006/0201243 | A1* | 9/2006 | Auffret et al. | 73/170.29 |
| 2008/0309346 | A1* | 12/2008 | MacGregor | G01V 3/083 |
| | | | | 324/334 |
| 2010/0246331 | A1 | 9/2010 | Paul et al. | |
| 2011/0267925 | A1 | 11/2011 | Tulupov et al. | |

OTHER PUBLICATIONS

Benny Lautrup, Buoyancy, Jan. 22, 2004, Revision 7.7. URL Retrieved: [http://www.cns.gatech.edu/~predrag/GTcourses/PHYS-4421-04/lautrup/7.7/buoyancy.pdf].*

D'Spain, G. L., W. S. Hodgkiss, and G. L. Edmonds. Trip Report—Aug. 1987 Swallow Float Deployment with RUM (Remote Underwater Manipulator). No. MPL-TM-400. Scripps Institution of Oceanography La Jolla CA Marine Physical Lab, 1988.*

Yang, Yan, Xiujun Sun, and Yanhui Wang. "Novel Autonomous Float for Deep-Sea Hydrothermal Plume Observation." The Twentieth International Offshore and Polar Engineering Conference. International Society of Offshore and Polar Engineers, 2010.*

Lobecker, R., et al. "Real-time oceanographic data from Georges Bank." Oceans'78. IEEE, 1978.*

Vasilescu, Iuliu, et al. "Autonomous modular optical underwater robot (amour) design, prototype and feasibility study." Robotics and Automation, 2005. ICRA 2005. Proceedings of the 2005 IEEE International Conference on. IEEE, 2005.*

Olofsson, Bjorn. Ocean Bottom Node Acquisition. SeaBird Exploration, on behalf of Fugro. Slide Set—Document p. 16-22. Mar. 8, 2012.*

Lewis, Brian TR, and James McClain. "Converted shear waves as seen by ocean bottom seismometers and surface buoys." Bulletin of the Seismological Society of America 67.5 (1977): 1291-1302.*

3M Oil and Gas Customer Center. 3M™ Glass Bubbles for Buoyancy and Thermal Insulation. High strength, low-density hollow glass microspheres for critical deepwater components. Issued: Jan. 2010 © 3M 2010.*

National Research Council (U.S.). Ad Hoc Committee on Massive Glass as a Naval Structural Material.; National Research Council (U.S.). National Materials Advisory Board. OCLC No. 25913549. ix, 98 pages. Publication NMAB, 262. Division of Engineering, National Research Council. Apr. 1970.*

Tsuchiya, Yoshito, and Masataka Yamaguchi. "Horizontal and vertical water particle velocities induced by waves." Coastal Engineering 1972. 1973. 555-568.*

Ramotowski, Thomas, and Kirk Jenne. "NUWC XP-1 polyurethane-urea: a new,"acoustically transparent" encapsulant for underwater transducers and hydrophones." Oceans 2003. Proceedings. vol. 1. IEEE, 2003.*

Hackathorn, Michael F. "The design of a deep ocean hydrophone." (1983).*

Jones, Rob, and H. Asanuma. "The tetrahedral geophone configuration: geometry and properties." SEG Technical Program Expanded Abstracts 2004. Society of Exploration Geophysicists, 2004. 9-12. (Year: 2004).*

Morozov, Igor B., Bradley J. Carr, and Scott B. Smithson. "Transformation of four-component vertical seismic profiling records from Kola superdeep borehole, Russia." Computers & Geosciences 23.10 (1997): 1039-1049. (Year: 1997).*

International Search Report dated May 6, 2013 in corresponding PCT/EP2012/076210.

Written Opinion dated May 6, 2013 in corresponding PCT/EP2012/076210.

Australian Patent Examination Report No. 1, dated May 19, 2014, in related Australian Patent Application No. 2012357114 (Both documents cited were previously provided in an IDS filed May 21, 2013 and Oct. 31, 2012).

French Written Opinion dated Oct. 10, 2012 in parent Application No. FR-1162168.

French Preliminary Search Report dated Oct. 10, 2012 in parent Application No. FR-1162168.

* cited by examiner

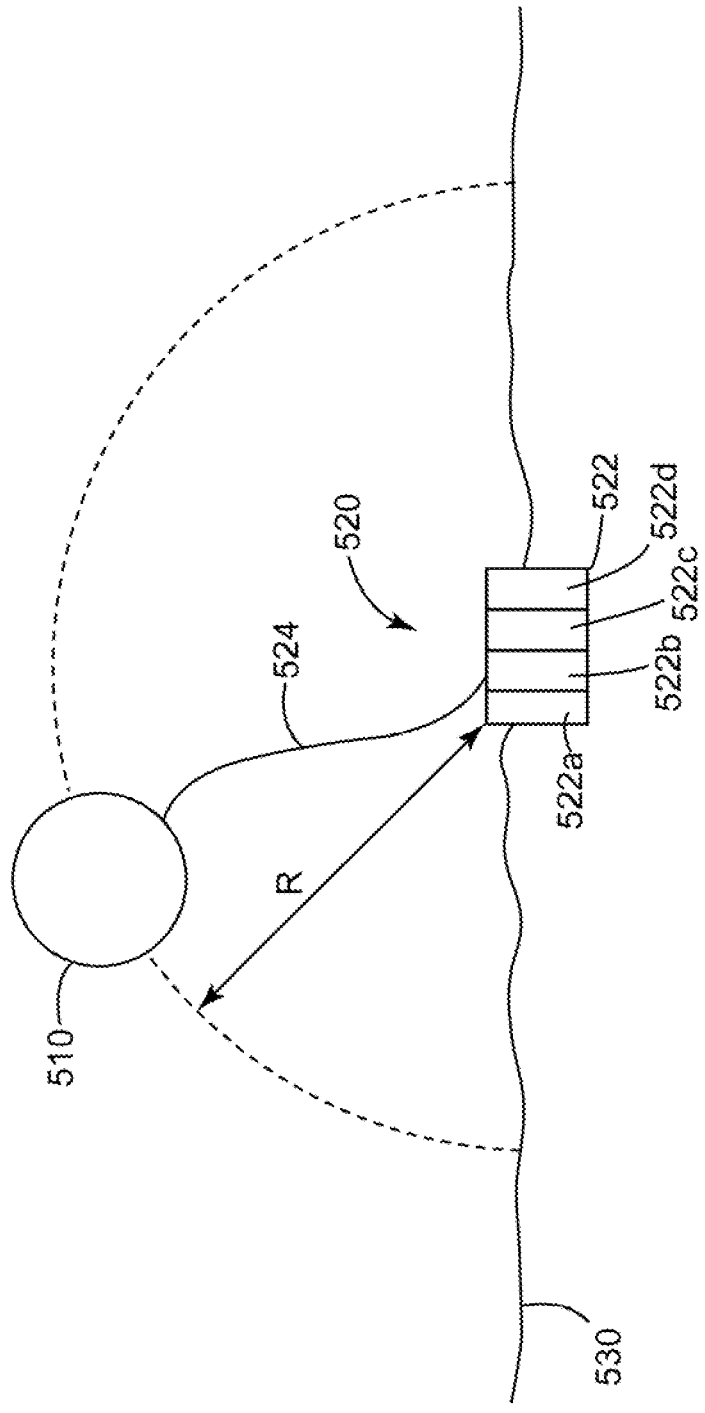

WATER-COUPLED UNDERWATER NODE FOR SEISMIC SURVEYS

BACKGROUND

Technical Field

Embodiments of the subject matter disclosed herein generally relate to methods and systems, and more particularly to mechanisms and techniques, for performing a marine seismic survey using water-coupled underwater nodes that carry appropriate seismic sensors.

Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of the geophysical structures under the seafloor is an ongoing process.

Reflection seismology is a method of geophysical exploration for determining the properties of earth's subsurface, which is especially helpful in the oil and gas industry. Marine reflection seismology is based on using a controlled source of energy that sends the energy into the earth. By measuring the time it takes for the reflections to come back to plural receivers, it is possible to evaluate the depth of features causing such reflections. These features may be associated with subterranean hydrocarbon deposits.

A traditional marine system for generating seismic waves and recording their reflections off the geological structures present in the subsurface is illustrated in FIG. 1. A vessel 10 tows an array of seismic receivers 11 provided on streamers 12. The streamers may be disposed along any depth profile relative to a surface 14 of the ocean. The streamers may be disposed to have other than horizontal spatial arrangements. The vessel 10 also tows a seismic source array 16 that is configured to generate a seismic wave 18. The seismic wave 18 propagates downwards toward the seafloor 20 and penetrates the seafloor until eventually a reflecting structure 22 (reflector) reflects the seismic wave. The reflected seismic wave 24 propagates upward until it is detected by the receiver 11 on the streamer 12. Based on the further analyses of the data collected by the receiver 11, an image of the subsurface is generated. The seismic source array 16 includes plural individual source elements.

FIG. 2 shows a vessel 40 towing two cables 42 provided at respective ends with deflectors 44. Plural lead-in cables 46 are connected to streamers 50. The plural lead-in cables 46 also connect to the vessel 40. The streamers 50 are maintained at desired distances from each other by separation ropes 48. Plural individual source elements 52 are also connected to the vessel 40 and to the lead-in cables 46 via ropes 54.

However, this traditional configuration is expensive as the cost of the streamers is high. In addition, this configuration might not provide accurate results as the water surface noise may interfere with the recordings. To overcome the latter problem, new technologies deploy plural seismic sensors on the bottom of the ocean to provide a coupling between the sensors and the ocean floor.

One such new technology is incorporated into the ocean bottom station (OBS) nodes. OBS are capable of providing better data than conventional acquisition systems because of their wide-azimuth geometry. Wide-azimuth coverage is helpful for imaging beneath complex overburdens like those associated with salt bodies. Salt bodies act like huge lenses, distorting seismic waves that propagate through them. To image subsalt targets, it is preferable to have the capability to image through complex overburdens, but even the best imaging technology alone is not enough. A good illumination of the targets is necessary. Conventional streamer surveys are operated with a single seismic vessel and have a narrow azimuthal coverage. If either the source or the receiver is located above an overburden anomaly, the illumination of some targets is likely to be poor. OBS nodes can achieve wide-azimuth geometry.

Additionally, OBS nodes are much more practical in the presence of obstacles such as production facilities. For the purpose of seismic monitoring with repeat surveys (4D), OBS have better positioning repeatability than streamers. Furthermore, OBS nodes provide multi-component data. Such data can be used for separating up- and down-going waves at the seabed, which is useful for multiple attenuations and for imaging using the numerous pieces of data. In addition, multi-component data allow for the recording of shear waves, which provide additional information about lithology and fractures and sometimes allow to image targets that have low reflectivity or are under gas clouds.

U.S. Pat. No. 6,932,185, the entire content of which is incorporated herein by reference, discloses this kind of node. In this case, the seismic sensors 60 are attached to a heavy pedestal 62, as shown in FIG. 3 (which corresponds to FIG. 4 of the patent). A station 64 that includes the sensors 60 is launched from a vessel and arrives due to its gravity, to a desired position. The station 64 remains on the bottom of the ocean permanently. Data recorded by the sensors 60 is transferred through a cable 66 to a mobile station 68. When necessary, the mobile station 68 may be brought to the surface to retrieve the data.

Although this method provides a better coupling between the seabed and the sensors, the method is still expensive and not flexible as the stations and corresponding sensors are left on the seabed.

An improvement to this method is described in European Patent No. EP 1 217 390, the entire content of which is incorporated herein by reference. In this document, a sensor 70 (see FIG. 4) is removably attached to a pedestal 72 together with a memory device 74. After recording the seismic waves, the sensor 70 together with the memory device 74 are instructed by a vessel 76 to detach from the pedestal 72 and to rise to the ocean surface 78 to be picked up by the vessel 76.

However, this configuration is not very reliable as the mechanism maintaining the sensor 70 connected to the pedestal 72 may fail to release the sensor 70. In addition, the sensor 70 and pedestal 72 may not achieve their intended positions on the bottom of the ocean. Furthermore, the pedestals 72 are left behind and thereby contribute to both ocean pollution and a price increase, which are both undesirable effects.

Accordingly, it would be desirable to provide systems and methods that provide inexpensive and non-polluting nodes for reaching the seabed and recording seismic waves.

SUMMARY

According to an exemplary embodiment, there is a marine node for recording seismic waves underwater. The node includes a spherical body made of a material that has a density similar to a density of the water so that the body is buoyant neutral or positive; a first sensor located in the body and configured to record three dimensional movements of the node; a second sensor located in the body and configured to record pressure waves propagating through the water; and one or more cables connected to the first and second sensors and configured to exit the body to be connected to an external device. The body is coupled to the water and the node is buoyancy neutral.

According to another exemplary embodiment, there is a marine node arrangement for recording seismic waves underwater. The arrangement includes a node configured to record the seismic waves; an anchor configured to attach to a bottom of the water; and a tether configured to connect the node to the anchor, the tether being configured to transfer data recorded by the node to the anchor. The node is completely coupled to water.

According to still another exemplary embodiment, there is a marine node arrangement for recording seismic waves underwater. The marine node arrangement includes a node comprising two or more seismic sensors for recording the seismic waves, a processor, a memory unit, and a power supply; and a cover configured to host the node. The node has a negative buoyancy and the cover has a positive buoyancy such that an overall buoyancy of the marine node arrangement is neutral or negative, and each of the two or more seismic sensors is coupled to water.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 8 is a schematic diagram of a node connected to an anchor according to an exemplary embodiment;

DETAILED DESCRIPTION

Figure 1:
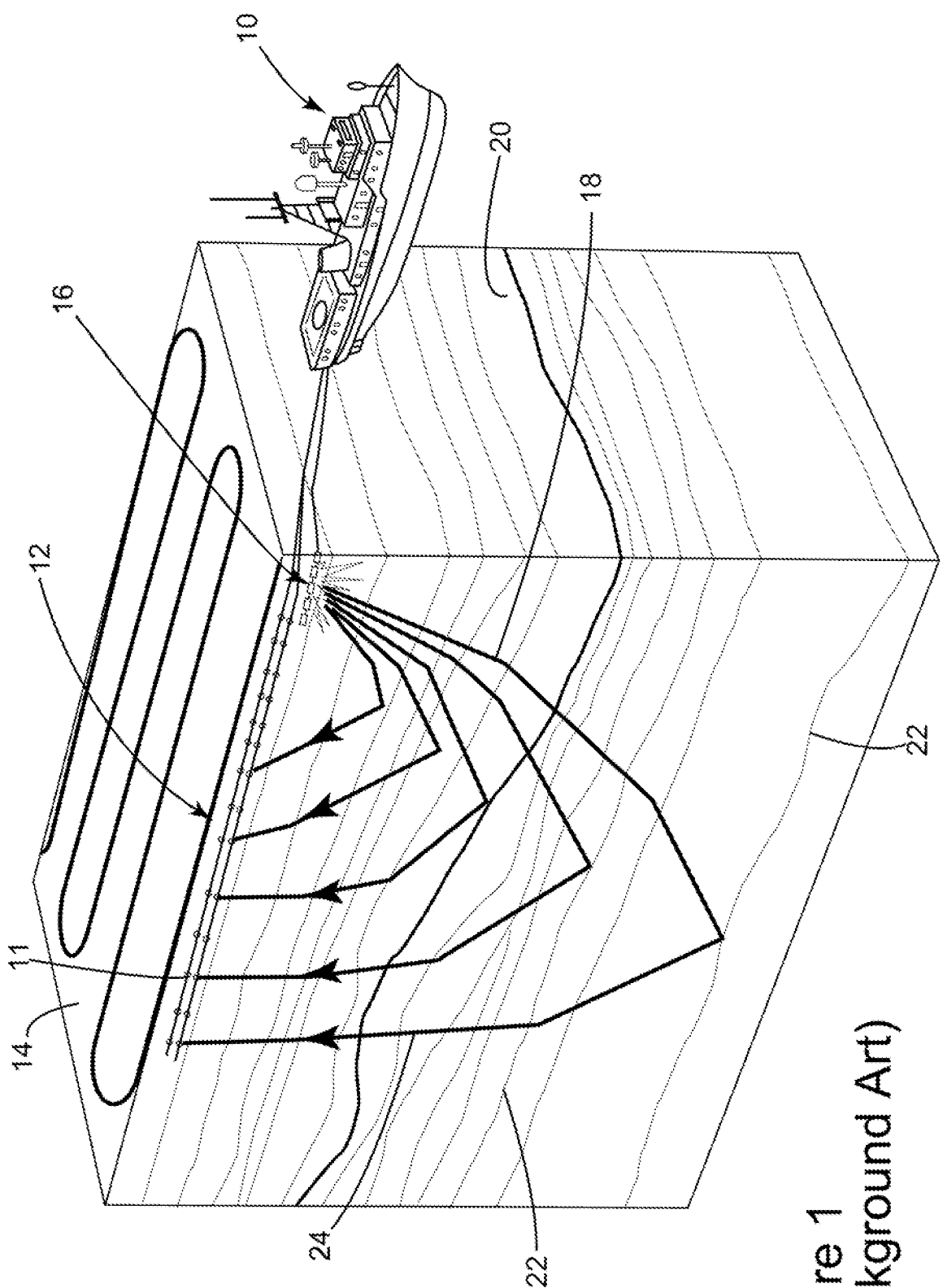
FIG. 1 is a schematic diagram of a conventional seismic survey system.
Figure 2:
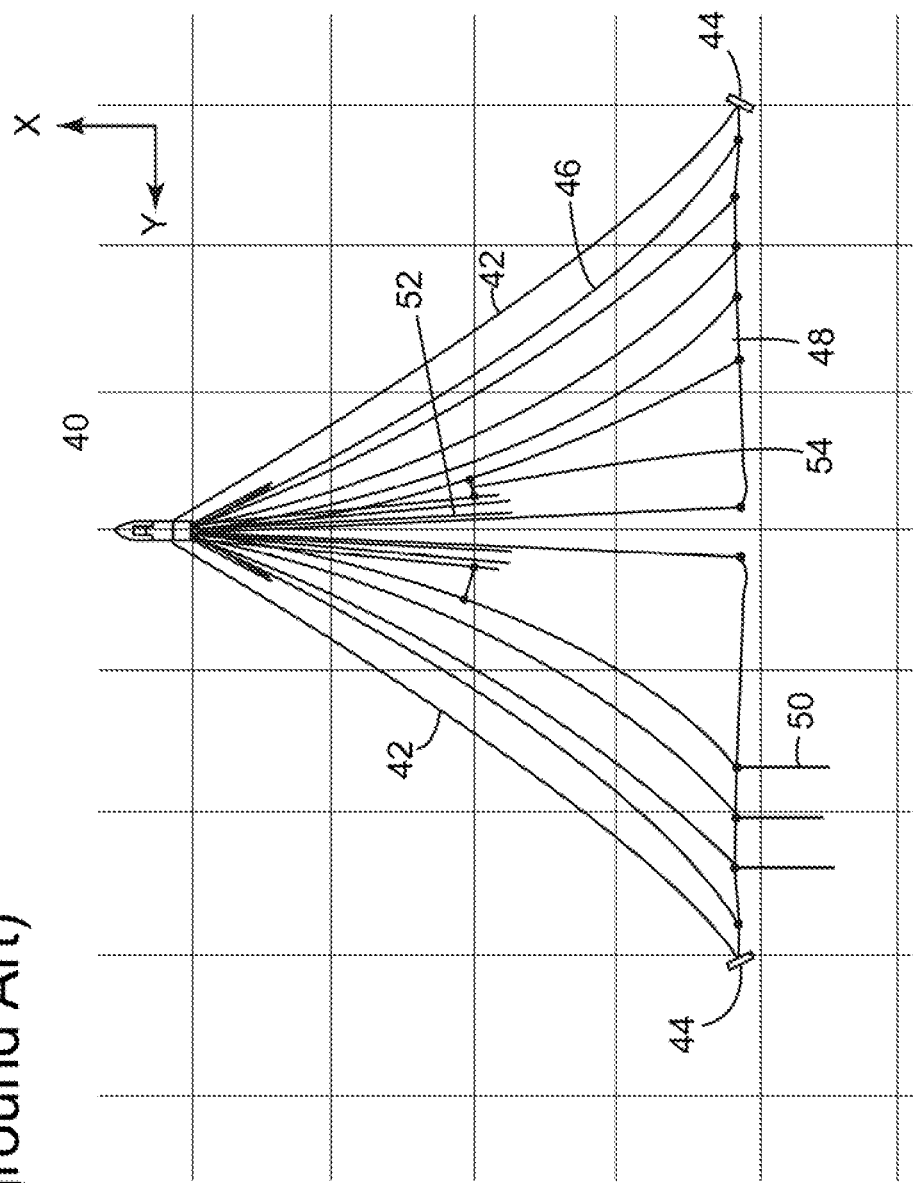
FIG. 2 illustrates a traditional arrangement of streamers and source arrays towed by a vessel.
Figure 3:
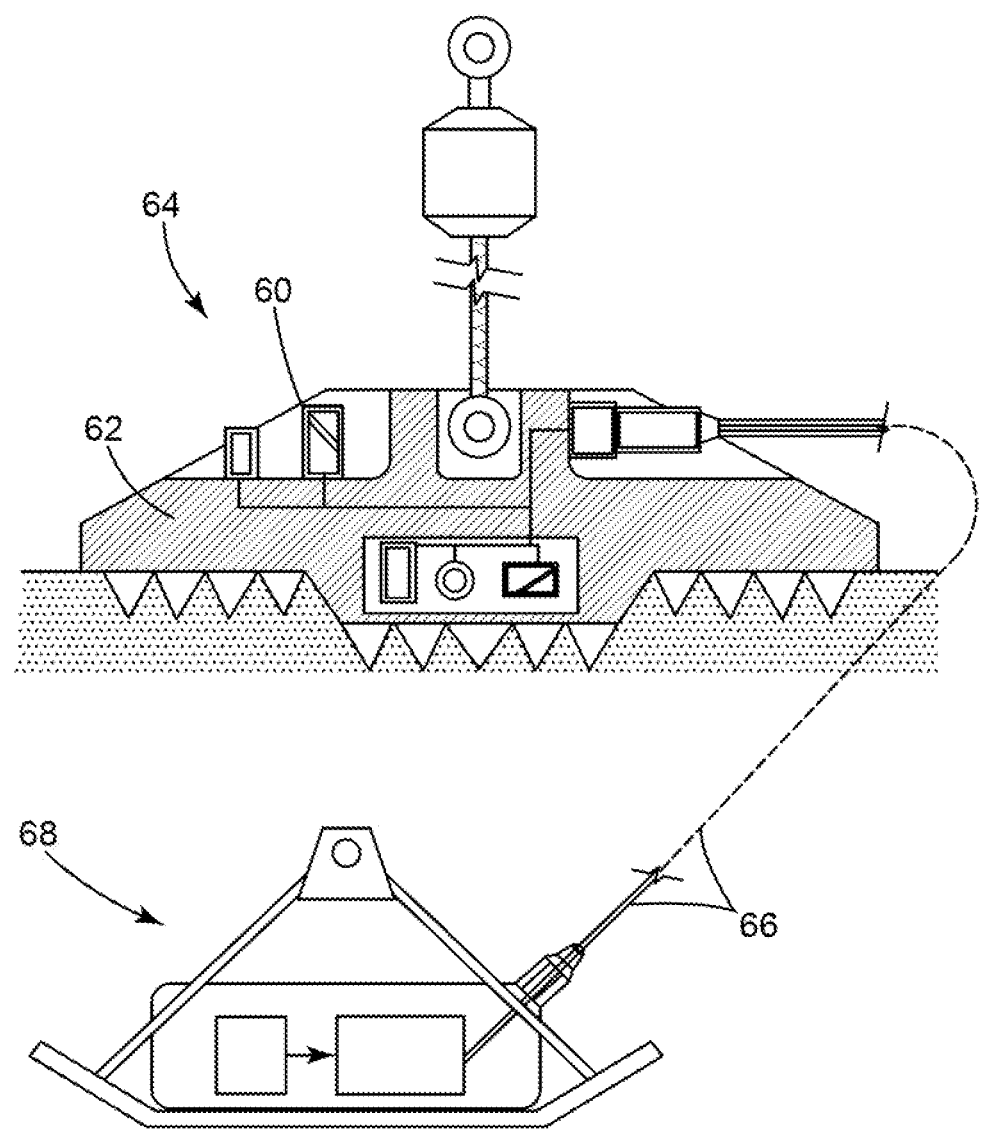
FIG. 3 is a schematic diagram of a station that may be positioned on the bottom of the ocean for seismic data recording.
Figure 4:
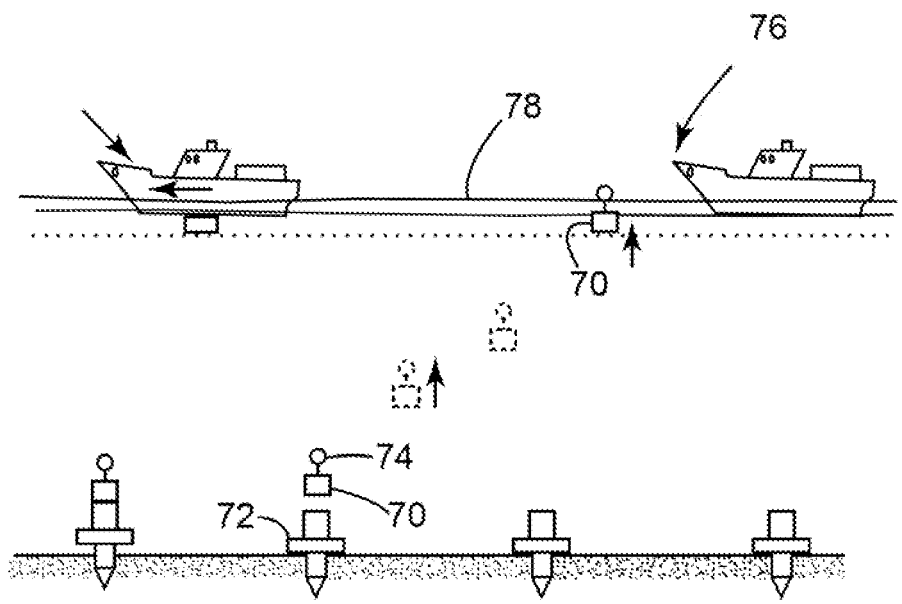
FIG. 4 is a schematic diagram of another station that may be positioned on the bottom of the ocean for seismic data recording.

The following description of the exemplary embodiments refers to the accompanying drawings. The same reference numbers in different drawings identify the same or similar elements. The following detailed description does not limit the invention. Rather, the scope of the invention is defined by the appended claims. The following embodiments are discussed, for simplicity, with regard to the terminology and structure of a water-coupled node having seismic sensors and being deployed underwater for performing seismic recordings. However, the embodiments to be discussed next are not limited to an independent node, since they may be applied to nodes attached to an autonomous underwater vehicle (AUV) or other platforms, such as a glider.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Emerging technologies in marine seismic surveys need an inexpensive system for deploying and recovering seismic receivers at or close to the seabed. According to an exemplary embodiment, such a seismic system includes plural inexpensive nodes, each having one or more seismic sensors. The seismic sensors may include a hydrophone, geophone, accelerometers, electromagnetic sensors, etc.

A node may be deployed by itself or by using an AUV. The node may be the payload of the AUV or may be linked to the AUV. The AUV may be a specially designed device or an off-the-shelf device that it is relatively inexpensive. The off-the-shelf device may be quickly retrofitted or modified to receive the node. A deployment vessel stores the nodes and/or AUVs and launches them as necessary for the seismic survey. The nodes and/or AUVs find their desired positions (preprogrammed in their local control device) using, for example, an inertial navigation system.

In one embodiment, the node has a spherical shape and is made of a material that has a density so close to the density of water that the overall buoyancy of the node is neutral or slightly negative. The material may also have the same rigidity as water. Thus, if a seismic wave makes the water particles move, the node, by being buoyant neutral and rigid, would follow the motion of the water particles and the sensors inside the node would be capable of recording that motion. Therefore, in one application, the node is coupled to water and not to the seabed, i.e., the node is floating and not in contact with the seabed. The node may include a hydrophone and three geophones, thus qualifying as a 4C (four component) seismic sensor. Other combinations of seismic sensors are possible, i.e., 2C, 3C, etc. In one application, the spherical node is rigid but still compressible. A weight distribution of the spherical node may be implemented such that the mass of the bottom part of the node (e.g., first half of the node) is larger than the mass of the top part (e.g., second half of the node). This feature ensures a given directionality (orientation) of the node. The node may be tethered to a rigid/elastic/visco-elastic anchor that is attached to the seabed. The data recorded by the node may be transmitted through the tether to the anchor. The anchor may be an existing OBC node. The node may also be deployed with the AUV. The AUV may have a flooding payload bay in which the node is provided or the AUV may tow the node. In this last case, the node may be located in a flooding cage. The node may also be deployed by itself.

As the deployment vessel is launching the nodes and/or AUVs, a shooting vessel may follow the deployment vessel for generating seismic waves. The shooting vessel may tow one or more seismic source arrays. The shooting vessel or another vessel, e.g., the recovery vessel, may then instruct selected nodes and/or AUVs to resurface so that they can be collected. Alternatively, the recovery vessel may use a remote-operated vehicle to collect the nodes from the ocean floor. In one embodiment, the deployment vessel also tows source arrays and shoots them as it deploys the nodes and/or AUVs.

In one exemplary embodiment, the number of nodes and/or AUVs is in the thousands. Thus, the deployment vessel is configured to hold all of them at the beginning of the survey and then to launch them as the seismic survey advances. If the shooting vessel is configured to retrieve the nodes and/or AUVs, when the number of available nodes and/or AUVs at the deployment vessel is below a predetermined threshold, the shooting vessel and the deployment vessel are instructed to switch positions in the middle of the seismic survey. If a dedicated recovery vessel is used to recover the nodes and/or AUVs, then the deployment vessel is configured to switch positions with the recovery vessel when the deployment vessel becomes empty.

In an exemplary embodiment, the seismic survey is performed as a combination of seismic sensors located on the nodes and on streamers towed by the deployment vessel, by the shooting vessel, or by both of them.

It is noted that a general computing device, which is modified with specific software instructions to generate an image of the subsurface, processes the data collected by the nodes discussed in the above descriptions. The amount of data may be large, e.g., in the order of terabytes, and therefore it is impractical if not impossible for a person to process this data in his mind. Thus, any processing claim, if present in this application, is related to computer processing and is not intended to cover mental acts of data processing.

Figure 5:
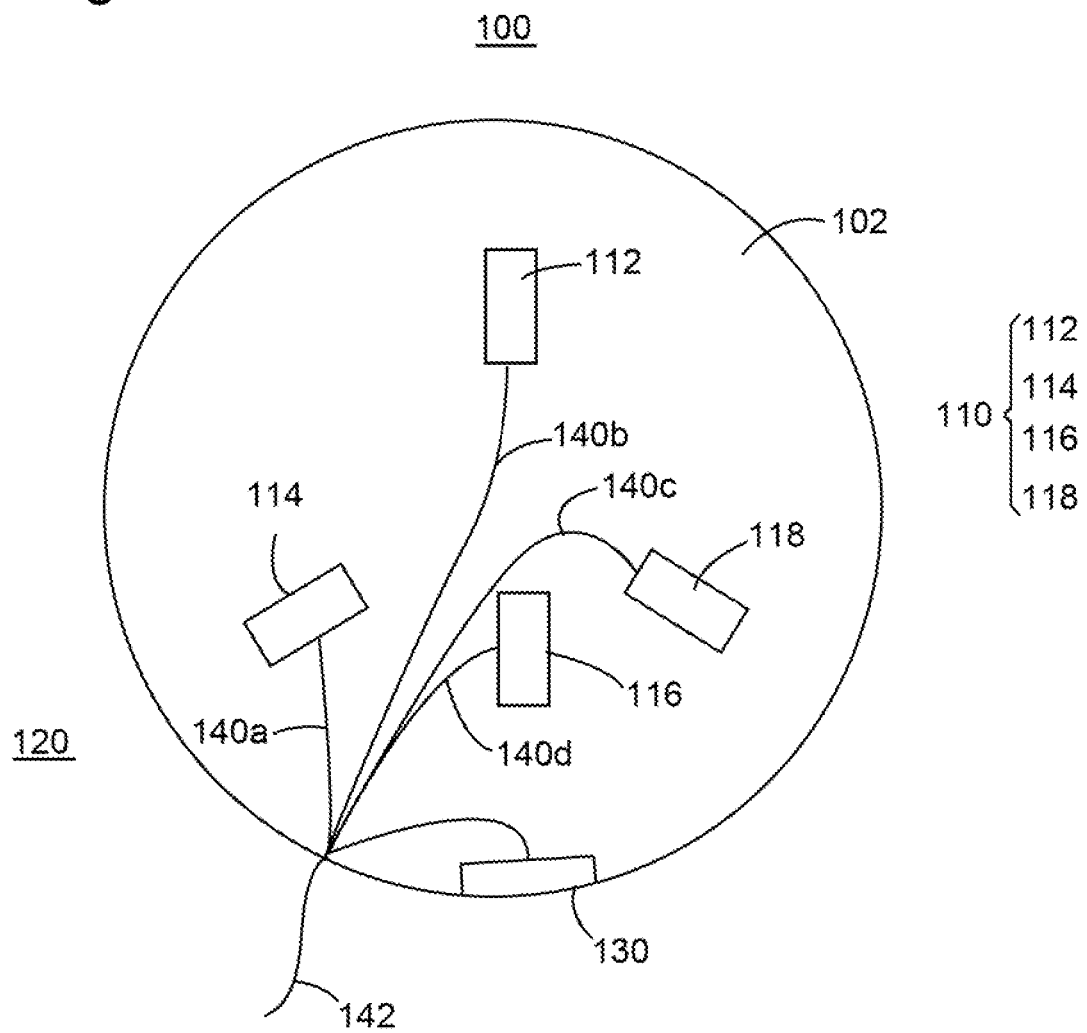
FIG. 5 is a schematic diagram of a node coupled to water according to an exemplary embodiment.

The above-noted embodiments are now discussed in more detail with regard to the figures. FIG. 5 illustrates a node 100 with a spherical body 102. The body may be made of a material that is neutrally buoyant, i.e., it has a density close to the density of water so that the body floats. In other words, a neutrally buoyant body, when placed in water, moves neither up nor down. In one application, it is preferable that the body has positive buoyancy so that, when various sensors are added to the body, the overall buoyancy of the node is neutral. Thus, in one application, the body may be made of a type of foam that has positive buoyancy. Positive buoyancy means than when the object is placed in water, the object has a natural tendency to move to the surface of the water. A negative buoyancy object has the natural tendency to move to the bottom of the water when placed in water.

The node 100 may include one or more seismic sensors. A first sensor 110 may be configured to record displacements of the water particles by recording corresponding displacements of the body 102. In this respect, it is noted that the node 100, by being neutrally buoyant, moves as the water particles move. The first sensor 110 may include one or more single sensors 112, 114, 116 and 118. The single sensors may be geophones or accelerometers or other similar sensors. In the present exemplary embodiment, the single sensors 112, 114, 116 and 118 are provided inside the body 102, i.e., they do not come in direct contact with the water. However, it is possible to have the sensors 112, 114, 116 and 118 communicate with the water 120), as shown by the node 200 in FIG. 6. In this case, a sealant 122 may be provided on the sensors to prevent the water 120 to enter the sensors or the body 102.

The node 100 may also include a second sensor 130. The second sensor 130 is different from the first sensor 110 and it is configured to record water pressures, i.e., p-waves. The data recorded by the second sensor 130 is collected by plural cables 140a-d and then transmitted through a cable 142 outside the node 100. Plural cables 140a-d may be provided inside the body 102 but also completely outside the body 102. In this regard, it is noted that in one application, the node 100 does not include any processor, data storing devices, processing devices, etc., as the data is simply recorded by the sensors and then transferred to an external device (to be discussed later) for processing and storing. This simplistic structure of the node makes it possible to achieve neutral buoyancy and also to reduce the cost of the nodes.

Figure 7:
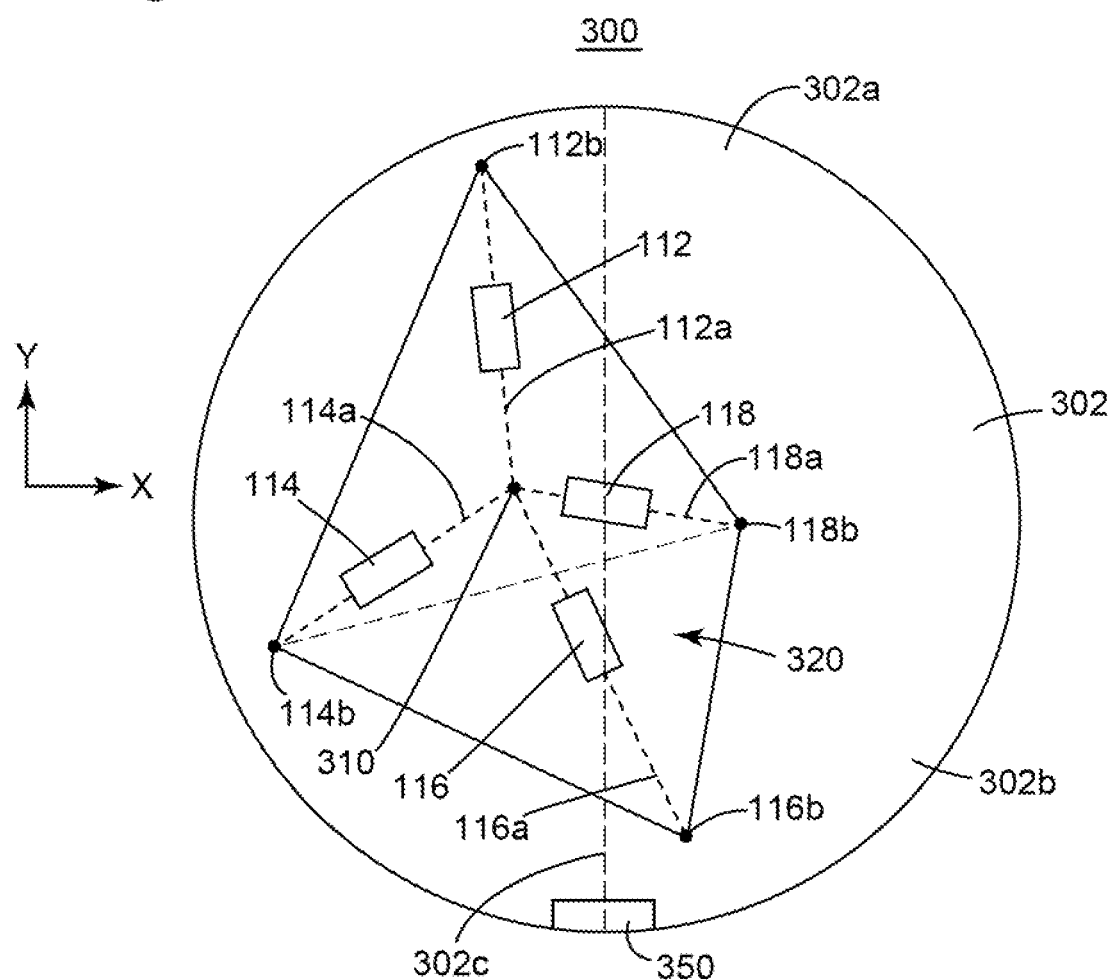
FIG. 7 is a schematic diagram of a node with sensors disposed in a tetrahedron according to an exemplary embodiment.

If the first sensor includes four individual sensors, these sensors may be arranged inside the body as shown in FIG. 7. In this embodiment, the node 300 still has a spherical body 302. Each of the four individual sensors 112, 114, 116 and 118 has its own sensing axis 112a, 114a, 116a and 118a. These four axes meet in a central point 310 and each axis intersects with a corresponding vertex 112b, 114b, 116b or 118b of a tetrahedron 320. The tetrahedron 320 may have all or some of the sides with the same length. In one application, the vertices of the tetrahedron are on the external surface of the body 302. However, in another application, the vertices are inside the body 302. In still another application, one single sensor 112 is provided in the first half 302a of the body 302 and the other single sensors 114, 116 and 118 are provided in the second half 302b of the body 302. In this way, the weight of the sensors is not distributed uniformly inside the body 302, which gives the body 302 a diameter 302c that aligns with gravity (i.e., Y axis). Thus, the node 300, when deployed, has a preferential orientation although it still has neutral buoyancy. In still another application, the center of mass of the node 300 is above the central point 310 along the diameter 302c. In one application, the center of mass may coincide with the central point 310.

Figure 6:
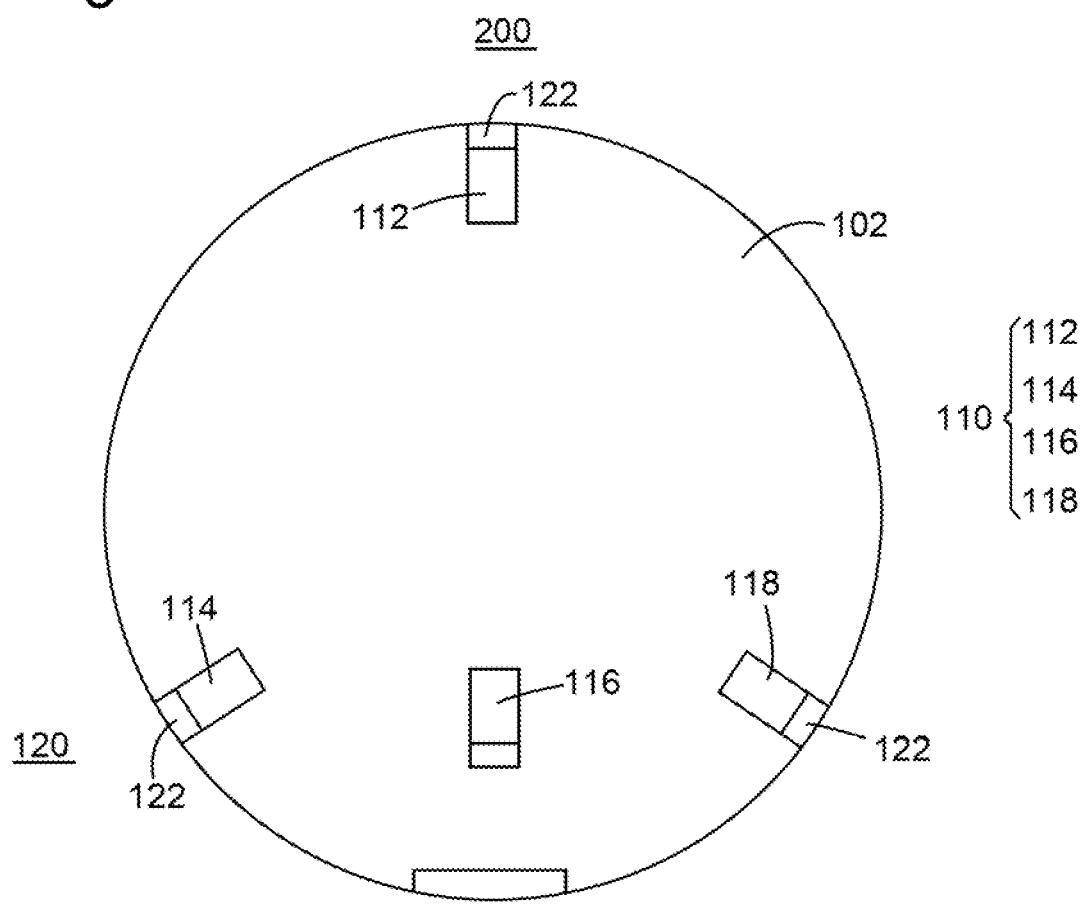
FIG. 6 is a schematic diagram of another node coupled to water according to an exemplary embodiment.

However, the orientation of the tetrahedron does not have to be as discussed in the above description. In fact, the orientation of the tetrahedron may be random. In one application, a ballast 350 may be added to the node for determining a preferential orientation as shown in FIG. 7. In one application, the second sensor 130 may be used as ballast as shown in FIGS. 5 and 6. In still another application, the second sensor 130 may be provided diametrically opposite to the single sensor 112 to orient the node as desired.

When deployed underwater, the node discussed in the above description is floating above the seabed. Thus, it is desirable to have a mechanism in place for confining the node to a predetermined volume when recording seismic data. A system 500 including a node 510 and an anchor mechanism 520 is shown in FIG. 8. The node 510 may be any of the nodes discussed in the above descriptions. The anchor mechanism 520 may include an anchor 522 and a tether 524. The tether 524 is connected between the node 510 and the anchor 522. The anchor 522 is shown in FIG. 8 as being in direct contact with the seabed 530. The anchor 522 may include various elements, e.g., a processing device 522a, an interface 522b that connects with an electrical cable for receiving data from the node 510, a memory unit 522c, a power supply 522d, etc. The electrical cable may be part of the tether 524 or may be the tether itself. The tether 524 may have a predetermined length R, which means that the position of the node 510 will be within a sphere of radius R around the anchor. If R is small, e.g., around 1 m, the position of the node 510 may be considered to coincide with the position of the anchor from a processing point of view.

Figure 9A:
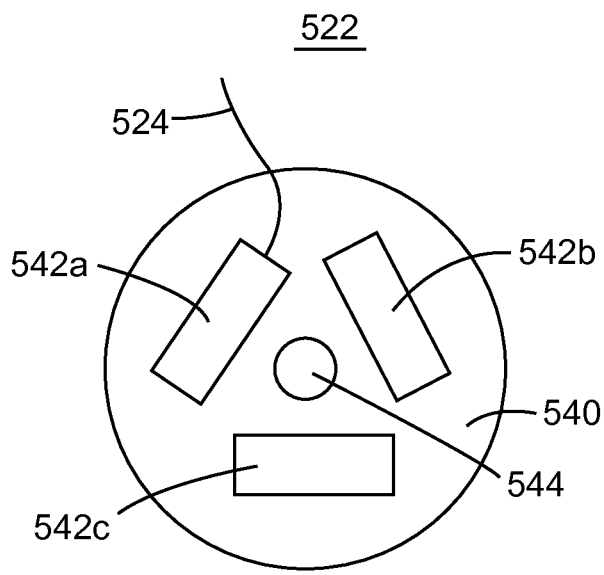
FIGS. 9A-B are schematic diagrams of a node coupled to the seabed.
Figure 9B:
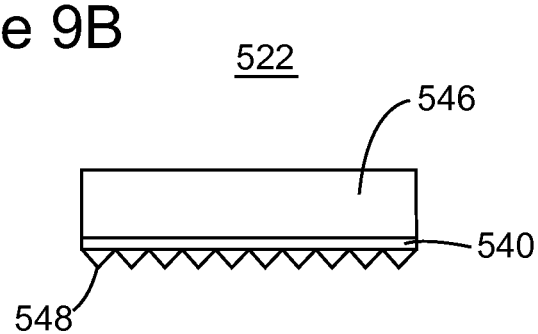

In one exemplary embodiment, the anchor 522 is by itself a node. As illustrated in FIGS. 9A-B, the anchor 522 may have a circular base 540 on which, for example, three packs 542a-c are provided. Each pack may contain one or more of the components illustrated in FIG. 8. Another pack 544 may contain three geophones or similar sensors and a hydrophone. The base 540 and packs 542*a-c* and 544 are covered by a cover 546 as shown in FIG. 9B. A remote operated vehicle (ROV) may handle the anchor 522, i.e., may deploy or collect the anchor 522. Ribs 548 may be provided on the base 540 for a better coupling with the seabed. One of the packs 542*a-c*, for example, pack 542*a* may include recording equipment. In this case, this pack is configured to connect to the tether 524.

Figure 10:
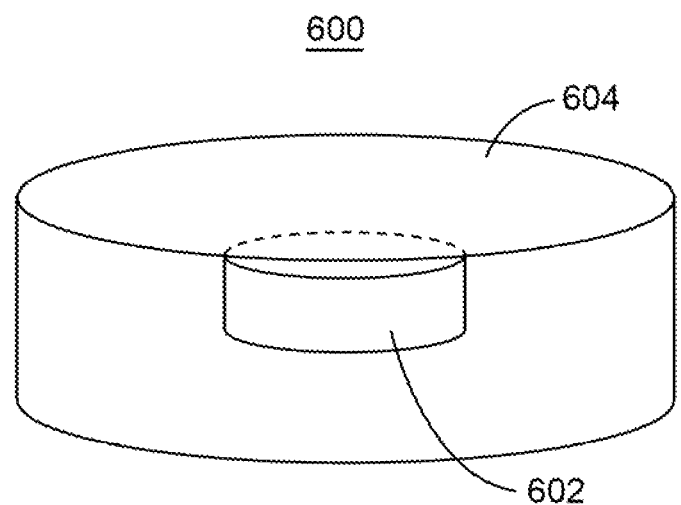
FIG. 10 is a schematic diagram of still another node coupled to water according to an exemplary embodiment.

According to another exemplary embodiment illustrated in FIG. 10, an alternative node arrangement 600 may include a node 602 and a positive buoyancy cover 604. More specifically, the node 602 may be the node 522 shown in FIGS. 9A-B or any of the existing node. Thus, the node 602 may include at least a hydrophone and a geophone. In one application, the node 602 includes a hydrophone and three geophones. Each seismic sensor of the node 602 is coupled to water and not to the seabed. Thus, such a node has all the necessary seismic sensors, energy supply, and processing devices built into it. However, such nodes have negative buoyancy, i.e., they do not float. Thus, the addition of the buoyancy cover 604, which has enough positive buoyancy, can make the overall node arrangement neutrally buoyant. Thus, such a modified node may float, similar to the nodes described in FIGS. 5-8.

An advantage of having the node floating instead of coupled to the ocean floor is that the coupling of all the nodes (in a typical survey hundreds if not thousands of nodes may be used) to the water is more uniform than the coupling of the existing nodes to the ocean floor. This uniform coupling ensures more accurate recorded data over all the frequency band.

This is different from the traditional seabed operations that use a two component (2C) or a four component (4C) receiver that is attempted to be coupled to the seabed. In the traditional operation, one component of the receiver is usually a hydrophone which is well coupled to the water. Often, the hydrophone signal is used to calibrate the "coupling" of the other velocity or acceleration sensors to the seabed. This seabed coupling is not always good and is typically worse than that of the hydrophone to the water. Thus, coupling in this manner allows the recording of p-waves in the water and sediment with the hydrophone and s-waves in the sediment with a 4C receiver. By measuring the p-wave signal represented as instantaneous pressure (hydrophone) and seabed motion (velocity or acceleration) it is possible to obtain wave-field separation and mirror imaging to separate multiples from reflections. The overall signal spectrum can be flattened by combining the pressure and motion signals to "fill in" the notches present at differing frequencies for the hydrophone-only and velocity-only signals.

However, the embodiments discussed above follow a different approach, i.e., coupling both the hydrophone and the motion sensors (velocity or acceleration) to the water as illustrated in FIGS. 5-10. By measuring the scalar instantaneous pressure (with the hydrophone) and the instantaneous vector particle motion (with the velocity or acceleration sensors), it is possible to understand the amplitude and direction of the p-wave propagation, achieving the wavefield separation and notch infill of the seabed not coupled system. Thus, with this novel system, the shear waves are not recorded as the shear waves cannot propagate in a fluid.

The embodiments illustrated in FIGS. 5-10 describe the idea of "floating" a velocity sensor in the water and combining its signal with a hydrophone. Thus, the particle motion of the water is measured together with the acoustic pressure from the p-wave propagation. Similar measurements can be made using the pressure gradient, the differential pressure at two points as the p-wave moves past them, etc.

The particle motion in response to the p-wave propagation in water is a vector property and thus it has to be measured as a velocity (or acceleration), i.e., to have a magnitude and a direction. In order to achieve this using sensors (geophones) that exhibit a typical cardioid (or directional) response, the embodiments of FIGS. 5-10 have seismic sensors that measure more than one component with each directional response pointing in a different direction. As there are six motion properties to measure (three translations along axes X, Y, and Z and three rotations, pitch, yaw, and roll), a multi-component particle motion sensor capable of measuring all six motions may be used.

To measure three translations and three rotations independently, it is possible to use a 6 channel recorder. However, this approach is inefficient. By arranging four transducers (geophones) as illustrated in the embodiments of FIGS. 5 to 7, with their sensing axes intersecting at the center of a tetrahedron and passing through the four vertices, and then combining two or more of these components, it is possible to regenerate the three translations and three rotations. Using this arrangement of sensing axes, the number of recording channels can be reduced to four for the geophones and one for the hydrophone.

In one application, the sensing axes intersect at the center of the tetrahedron and this may also be the center of mass of the package. For this reason, a good candidate package is a spherical body as illustrated in FIGS. 5 to 7. As already noted above, to make the package track the particle motion of the water, it should be neutrally buoyant and rigid.

Further matters to consider in the design of the node are the reference coordinates and the position of the node. It is preferable to know where the p-wave is heading. To accomplish this, a heading sensor, a three component tilt meter and some method of measuring or securing the position of the node against drift can be used. In other words, a complete inertial system might be necessary. However, the novel node needs to be light and inexpensive. Thus, a full inertial system that would be hosted by the node is not desirable.

The novel nodes proposed above may solve this problem by making the center of mass offset below the intersection point of the sensing axes in a neutrally buoyant package. Thus, the node acts like a self-righting gimbal system so that a vertical orientation is defined. The remaining reference axes are azimuth and position. If geophones are used in the node, a compass cannot be added because of the magnetic field of the geophone. Thus, the azimuth is challenging to track. The position of the node is also difficult to measure and track underwater.

Figure 11:
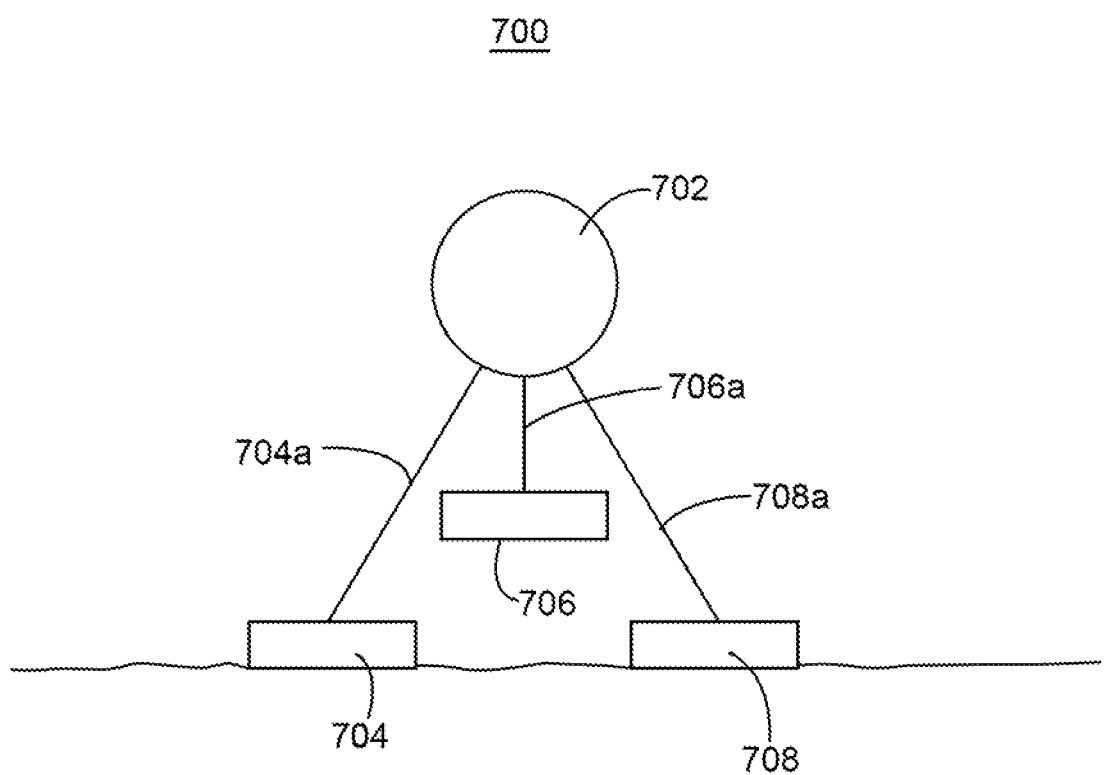
FIG. 11 is a schematic diagram of a node connected via multiple tethers to multiple anchors according to an exemplary embodiment.

Hence, the tether shown in FIG. 8 fixes the neutrally buoyant node to an anchor on the seafloor for confining the node to a given volume. This approach defines the position of the node within a certain radius. However, the azimuth is more difficult to determine. One approach is to use multiple tethers 704*a*, 706*a*, and 708*a* to connect the node 702 to seabed anchors 704, 706 and 708 to avoid rotations as illustrated in FIG. 11. Another approach might be to use a single anchor as shown in FIG. 8 but to use multiple tethers to connect the node 510 to the anchor 522. Still another approach is to use the recorded data for determining the azimuth. The first arrivals at the seismic sensors have a polarity that, if measured, may indicate the azimuth.

Another solution was illustrated in FIG. 10. A negative buoyancy seabed node 602 already provides measurement of the three translations and the instantaneous pressure. This node has negative buoyancy so that it couples to the seabed. To turn this node into a particle motion sensor, the negative buoyancy of the node is reduced by using the cover 604 until the system 600 becomes neutrally buoyant. However, to solve the tilt, position, and azimuth, it is possible to design the size of the cover 604 so that the entire system 600 is on the negative side of neutral buoyancy (e.g., a bulk density of 1.1 gm/cc) so that the node 602 stays on the seabed, yet still responds to the water particle motion.

One or more of the exemplary embodiments discussed above discloses a water-coupled node configured to perform seismic recordings. It should be understood that this description is not intended to limit the invention. On the contrary, the exemplary embodiments are intended to cover alternatives, modifications, and equivalents, which are included in the spirit and scope of the invention as defined by the appended claims. Furthermore, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A marine node for recording seismic waves underwater, the node comprising:
    a spherical body made of a material that has a density equal to or less than a density of the water so that the body is buoyant neutral or positive;
    a first sensor located in the body and configured to record three dimensional movements of the node;
    a second sensor located in the body and configured to record pressure waves propagating through the water; and
    one or more cables connected to the first and second sensors and configured to exit the body to be connected to an external device,
    wherein
        the body is coupled to the water and the node is buoyancy neutral,
        the first sensor includes four individual sensors configured to determine a motion of the body,
        each of the four individual sensors has a corresponding sensing axis, and the four axes intersect at a central point, and
        the first sensor and the second sensor are arranged inside the spherical body so as to have a first half of the spherical body heavier than a second half thereof thereby favoring a stable vertical orientation of the spherical body with the first half under the second half.

2. The node of claim 1, wherein the entire body is coupled to the water and not to the seabed.

3. The node of claim 1, wherein the external device is an anchor.

4. The node of claim 3, wherein the anchor is fixedly attached to the seabed and the one or more cables acts as a tether to maintain the body at a fixed distance from the anchor.

5. The node of claim 1, wherein the central point is a center of a tetrahedron and each sensing axis also intersects a corresponding vertex of the tetrahedron.

6. The node of claim 5, wherein three of the four individual sensors are provided in the first half of the spherical body and the fourth individual sensor is provided in the second half thereof.

7. The node of claim 1, wherein the second sensor is used as ballast being placed in the first half of the spherical body to orient a predetermined diameter of the body along a gravity direction.

8. The node of claim 7, wherein the first sensor includes four independent sensors having sensing axes extending from a center to vertices of a tetrahedron and the second sensor is provided diametrically opposed to one of the four independent sensors.

9. A marine node arrangement for recording seismic waves underwater, the marine node arrangement comprising:
    a node comprising two or more seismic sensors for recording the seismic waves, a processor, a memory unit, and a power supply, wherein one of the two or more sensors includes four individual sensors configured to determine a motion of the node, each of the four individual sensors has a corresponding sensing axis, and the four axes intersect at a central point; and
    a cover configured to provide positive buoyancy to the node,
    wherein
        the node has a negative buoyancy and the cover has a positive buoyancy such that an overall buoyancy of the marine node arrangement is neutral or negative,
        the first sensor and the second sensor are arranged inside the spherical body so as to have a first half of the spherical body heavier than a second half thereof thereby favoring a stable vertical orientation of the spherical body with the first half under the second half, and
        each of the two or more seismic sensors is acoustically coupled only to water to receive the seismic waves.

* * * * *